Aug. 13, 1963  A. W. GARDES ETAL  3,100,559
ONE WAY CLUTCH
Filed Sept. 19, 1961

INVENTORS
ALFRED W. GARDES
JOSEPH F. GLUTH
by Robert R. Lockwood
Attys.

United States Patent Office 3,100,559
Patented Aug. 13, 1963

3,100,559
ONE WAY CLUTCH
Alfred W. Gardes, Wilmette, and Joseph F. Gluth, Chicago, Ill., assignors to International Register Company, Chicago, Ill., a corporation of Illinois
Filed Sept. 19, 1961, Ser. No. 139,290
5 Claims. (Cl. 192—43.2)

This invention relates, generally, to clutches and it has particular relation to one way clutches.

Among the objects of this invention are: To provide an improved clutch construction that is simple and efficient in operation and can be readily and economically manufactured and installed; to provide in a new and improved manner a driving connection between a shaft and a member freely rotatable thereon on relative rotation of the shaft with respect to the member in one direction while permitting the shaft to ratchet past the member on relative rotation in the opposite direction; to provide a longitudinally knurled section on the shaft for cooperation with a pawl mounted in a transverse slot in the member; to bias an edge portion of the pawl into engagement with the ridges of the longitudinally knurled section one by one; and to form the slot and pawl with rectangular cross sections and to bias the pawl endwise of the slot by a spring in an annular slot in the member.

Other objects of this invention will, in part, be obvious and in part appear hereinafter.

Figure 1:
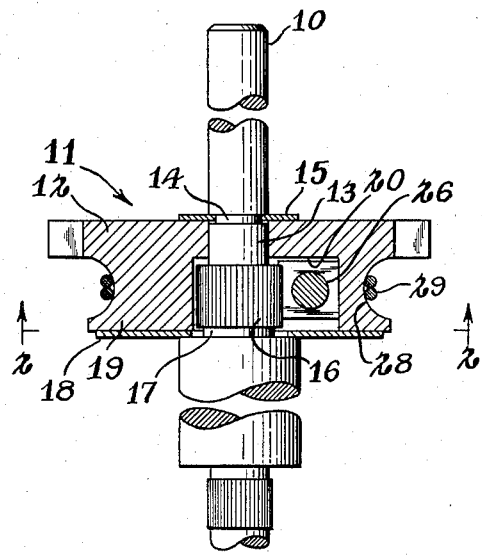
FIG. 1 is a top plan view, partly in section, illustrating a clutch construction in which the present invention is embodied.
Figure 2:
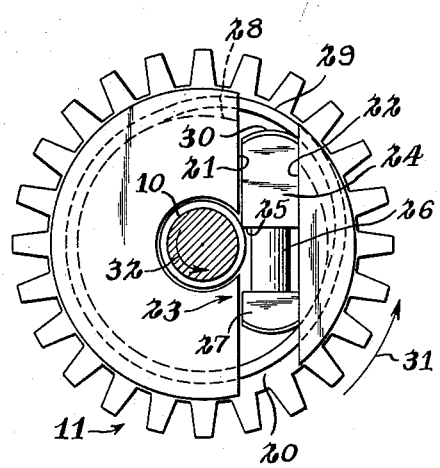
FIG. 2 is a sectional view taken along the line 2—2 of FIG. 1.

Referring now particularly to FIGS. 1 and 2 of the drawing, it will be observed that the reference character 10 designates a shaft which may have a diameter of .080" and it may be arranged to carry a pointer of an interval timer or it may be used for other purposes as may be desired. Freely rotatably mounted on the shaft 10 is a member that is indicated at 11. As shown, the member 11 is in the form of a gear and is provided with gear teeth around its periphery. The member 11 has a first portion 12 that is journaled on a bearing section 13 of the shaft 10. Adjacent the bearing section 13 is an annular groove 14 for receiving a removable E-ring 15 that is employed in conventional manner for preventing endwise movement of the member 11 on the shaft 10.

Adjacent the bearing section 13 there is a longitudinally knurled section 16 which, for illustrative purposes, may have a diameter of .1245" and may be provided with thirty two teeth or ridges the purpose of which will be apparent presently. Adjacent the longitudinally knurled section 16 is an annular groove 17 for receiving a flat washer 18 that cooperates with the E-ring 15 to hold the member 11 in a predetermined position on the shaft 10 while permitting it to rotate freely with respect thereto except as provided herein.

The member 11 is provided with a second portion 19 that is integral therewith and overlies the knurled section 16. The second portion 19 of the member 11 has a transverse opening 20 in the form of a slot having a rectangular cross section with one side being open and overlain by the washer 18. It will be observed in FIG. 2 that the transverse opening 20 has one flat side 21 which is generally positioned in tangential relationship to the longitudinally knurled section 16 and at a radial distance from the axis of the shaft 10 which is somewhat less than the radius of the longitudinally knurled section 16. The transverse opening 20 also includes another flat side 22 that is parallel to the one flat side 21 and is spaced radially further from the axis of rotation of the shaft 10. Slidably mounted in the transverse opening or slot 20 is a pawl that is indicated, generally, at 23. The pawl 23 has an end portion 24 of generally rectangular cross section and it is relatively long and loosely fits in the slot or transverse opening 20. For illustrative purposes, it is pointed out that the transverse opening or slot 20 may have a radial width of .082" while the pawl 23 is formed of square stock material having a width and thickness of .078" thereby providing a loose fit with the transverse opening or slot 20. The end portion 24 has an edge 25 that is arranged, under certain operating conditions, to engage the ridges of the knurled section 16 one by one, either to provide a driving connection between the member 11 and shaft 10 or to permit them to ratchet relative to each other depending upon the direction in which torque is being transmitted. A connecting portion 26 extends from the end portion 24 to another end portion 27 of the pawl 23. The other end portion 27 is relatively short and acts as a guide in the transverse opening or slot 20 for the pawl 23.

It will be noted that the second portion 19 of the member 11 is provided with an annular groove 28 and that a helical spring 29 is positioned therein. The helical spring 29 engages the outer end 30 of the end portion 24 of the pawl 23 and acts to bias it endwise of the transverse opening or slot 20 in order to position the edge 25 in engagement with the ridges of the longitudinally knurled section 16.

When the pawl 23 is positioned in the transverse opening or slot 20 as shown in FIG. 2 and the member 11 is driven in the direction indicated by the arrow 31 by a suitable pinion in engagement with the teeth of the member 11, the outer side of the end portion 24 of the pawl 23 bears against the flat side 22 and the edge 25 then engages the next ridge on the longitudinally knurled section 16 to place the member 11 in driving connection with the shaft 10. As a result, the shaft 10 rotates in the direction indicated by the arrow 32 and this relationship continues as long as a driving torque is applied to the member 11.

Now, when the member 11 is stationary, the shaft 10 is free to continue to rotate in the direction indicated by the arrow 32. Such rotation may be desired in order to return the shaft 10 to a given position where it can be again picked up and rotated by rotation of the member 11 driven in the manner described.

Employing the construction shown in FIGS. 1 and 2 of the drawing with the dimensions indicated which have been mentioned for illustrative purposes only, it is possible to develop a torque of 100 inch ounces for application to drive the shaft 10. When the member 11 is not driven, the amount of torque required to rotate the shaft 10 in the direction indicated by the arrow 32 where the edge 25 ratchets past the knurled section 16 is relatively negligible.

Figure 3:
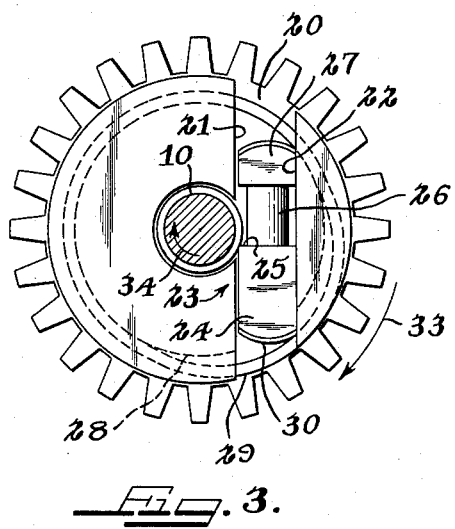
FIG. 3 is a view, similar to FIG. 2, but showing the pawl positioned oppositely with respect to its position in FIG. 2 to permit reverse operation.

When it is desired to reverse the direction in which torque is transmitted from the member 11 to the shaft 10, the pawl 23 is reversed in its position in the transverse opening or slot 20 as shown in FIG. 3. Using the relationship here shown, when torque is applied to rotate the member 11 in the direction indicated by the arrow 33, the shaft 10 will be rotated in the direction indicated by the arrow 34. Here the helical spring 29 reacts against the outer end 30 of the end portion 24 of the pawl 23 in the reversed position to move the edge 25 into operative engagement with the ridges of the knurled section 16. The outer side of the end portion 24 of the pawl 23 in the reversed position reacts against the juxtaposed flat side 22 at the opposite end. When torque no longer is applied to the member 11 the shaft 10 can be rotated in the direction indicated by the arrow 34 on application of a relatively small amount of torque.

Figure 4:
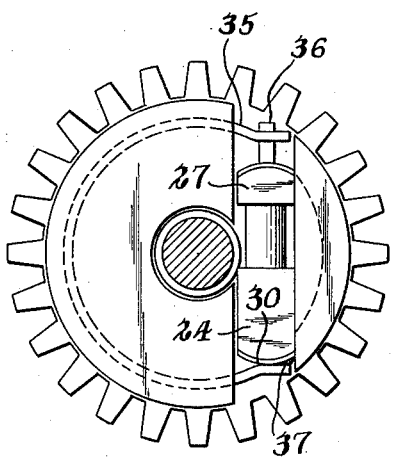
FIG. 4 is a view, similar to FIG. 3, and shows a different arrangement of the spring for biasing the pawl.

FIG. 4 shows a construction that is modified from that shown in the preceding figures in that, instead of the helical spring 29 in the annular groove 28, a C-shaped spring 35 is employed. One end of the C-shaped spring 35 is loosely fitted over a pin 36 that extends longitudinally from the other end portion 27 of the pawl 23. The other end of the C-shaped spring 35 is secured, as by welding, at 37 to the outer end 30 of the end portion 24 of the relatively long part of the pawl 23. When the C-shaped spring 35 is employed in lieu of the helical spring 29, the operation of the pawl 23 for transmitting torque from the member 11 to the shaft 10 while permitting ratcheting movement therebetween is the same as described hereinbefore in connection with the embodiment of the invention shown in FIGS. 1, 2 and 3 of the drawing.

In the foregoing description it has been assumed that the member 11 is the driving member while the shaft 10 is driven thereby or ratchets past the same on continued application of torque thereto independently of the member 11. It will be understood that the functions of the member 11 and shaft 10 can be reversed with the latter acting as the driving member and the former being driven.

It has been pointed out that the edge 25 on the end portion 24 of the pawl 23 engages one of the ridges of the longitudinally knurled section 16. One reason for using this construction is to provide a minimum of relative movement between the member 11 and the shaft 10 when torque is to be transmitted from one to the other. Where substantial relative movement can be permitted, a toothed gear can be employed instead of the knurled section 10 with the edge 25 on the end portion 24 of the pawl 23 arranged to engage the next gear tooth.

A limitation on the amount of torque that can be transmitted between the member 11 and the shaft 10 is the ability of that part of the second portion 19 of the member 11 on which the flat side 22 is located to resist the thrust applied thereto. This resistance can be improved by forming the transverse opening or slot 20 so that it extends only part way across the second portion 19 as by closing off that end shown in FIGS. 2 and 3 in which the guide end portion 27 of the pawl 23 slides. Such a construction can be made employing sintered powdered metal and molding it to form the member 11 with the slot 20 extending only part way. Further improvement can be made by providing a connection between the two segments of the second portion 19 formed by the slot 20 with the connection overlying the relatively long end portion 24 of the pawl 23 and being partially coextensive therewith along the intermediate part thereof.

What is claimed as new is:

1. A one way clutch mechanism comprising, in combination, a shaft having a longitudinally knurled section, a member having a first portion freely rotatably mounted on said shaft and a second portion overlying said knurled section, said second portion having a transversely extending slot opening laterally away from said first portion, said slot having one flat side extending generally tangentially to said knurled section and another flat side spaced radially outwardly from said one flat side; a pawl having a rectangular cross section slidable in said slot and an edge portion engageable with the ridges of said knurled section one by one, adapted to react against said other flat side on rotation of said shaft in one direction relative to said member to prevent further rotation in the same direction, and adapted to ratchet past said ridges on rotation of said shaft in the opposite direction relative to said member; said second portion having an annular slot communicating with said transversely extending slot, and spring means in said annular slot biasing said pawl endwise of said transversely extending slot and said edge portion of said pawl into operative engagement with a ridge of said knurled section.

2. A one way clutch mechanism comprising, in combination, a shaft having a longitudinally knurled section, a member having a first portion freely rotatably mounted on said shaft and a second portion overlying said knurled section, said second portion having a transversely extending slot opening laterally away from said first portion, said slot having one flat side extending generally tangentially to said knurled section and another flat side spaced radially outwardly from said one flat side; a pawl having a rectangular cross section slidable in said slot and an edge portion engageable with the ridges of said knurled section one by one, adapted to react against said other flat side on rotation of said shaft in one direction relative to said member to prevent further rotation in the same direction and adapted to ratchet past said ridges on rotation of said shaft in the opposite direction relative to said member; said second portion having an annular slot communicating with said transversely extending slot, and a generally C-shaped spring in said annular slot with one end reacting against said pawl and biasing it endwise of said transversely extending slot and said edge portion of said pawl into operative engagement with a ridge of said knurled section.

3. A one way clutch mechanism comprising, in combination, a shaft having a longitudinally knurled section, a member having a first portion freely rotatably mounted on said shaft and a second portion overlying said knurled section, said second portion having a transversely extending slot opening laterally away from said first portion, said slot having one flat side extending generally tangentially to said knurled section and another flat side spaced radially outwardly from said one flat side, a pawl having end portions of rectangular cross section slidable in said slot with a connecting portion therebetween spaced from said one flat side, one of said end portions acting as a guide in said slot; the other end portion having an edge portion engageable with the ridges of said knurled section one by one, adapted to react against said other flat side on rotation of said shaft in one direction relative to said member to prevent further rotation in the same direction, and adapted to ratchet past said ridges on rotation of said shaft in the opposite direction relative to said member; and spring means biasing said pawl endwise of said slot into operative engagement with a ridge of said knurled section.

4. A one way clutch mechanism comprising, in combination, a shaft having a longitudinally knurled section, a member having a first portion freely rotatably mounted on said shaft and a second portion overlying said knurled section, said second portion having a transversely extending slot opening laterally away from said first portion, said slot having one flat side extending generally tangentially to said knurled section and another flat side spaced radially outwardly from said one flat side, a pawl having end portions of rectangular cross section slidable in said slot with a connecting portion therebetween spaced from said one flat side, one of said end portions acting as a guide in said slot; the other end portion having an edge portion engageable with the ridges of said knurled section one by one, adapted to react against said other flat side on rotation of said shaft in one direction relative to said member to prevent further rotation in the same direction, and adapted to ratchet past said ridges on rotation of said shaft in the opposite direction relative to said member; said second portion having an annular slot communicating with said transversely extending slot, and spring means in said annular slot reacting against said other end portion of said pawl and biasing it endwise of said transversely extending slot and said edge portion of said pawl into operative engagement with a ridge of said knurled section.

5. A one way clutch mechanism comprising, in combination, a shaft having a longitudinally knurled section, a member having a first portion freely rotatably mounted on said shaft and a second portion overlying said knurled section, said second portion having a transversely extending slot opening laterally away from said first portion, said slot having one flat side extending generally tangentially to said knurled section and another flat side spaced radially outwardly from said one flat side, a pawl having end portions of rectangular cross section slidable in said slot with a connecting portion therebetween spaced from said one flat side, one of said end portions acting as a guide in said slot; the other end portion having an edge portion engageable with the ridges of said knurled section one by one, adapted to react against said other flat side on rotation of said shaft in one direction relative to said member to prevent further rotation in the same direction, and adapted to ratchet past said ridges on rotation of said shaft in the opposite direction relative to said member, said second portion having an annular slot communicating with said transversely extending slot, and a generally C-shaped spring in said annular slot with one end loosely connected to said one end portion of said pawl and the other end secured to said other end portion of said pawl and biasing it endwise of said transversely extending slot and said edge portion of said pawl into operative engagement with a ridge of said knurled section.

References Cited in the file of this patent
UNITED STATES PATENTS

| | | |
|---|---|---|
| 1,388,836 | Ripsch et al. | Aug. 23, 1921 |
| 2,957,377 | Hare | Oct. 25, 1960 |